United States Patent [19]

Murphy

[11] Patent Number: 5,080,543
[45] Date of Patent: Jan. 14, 1992

[54] FASTENING SLEEVES AND FASTENING SYSTEMS EMPLOYING SAME

[75] Inventor: Colin R. R. Murphy, Morristown, N.J.

[73] Assignee: Engineered Construction Components (America) Inc., Panama City, Panama

[21] Appl. No.: 609,467

[22] Filed: Nov. 5, 1990

Related U.S. Application Data

[63] Continuation-in-part of Ser. No. 462,020, Jan. 8, 1990, abandoned.

[51] Int. Cl.$^5$ ............................................. F16B 13/06
[52] U.S. Cl. ...................................... 411/60; 411/57; 411/44
[58] Field of Search ................ 411/14, 57, 44, 59–62, 411/71–73

[56] References Cited

U.S. PATENT DOCUMENTS

| | | | |
|---|---|---|---|
| 3,171,321 | 3/1965 | Fischer | 411/57 X |
| 3,236,145 | 2/1966 | Schenkel | 411/62 |
| 3,283,642 | 11/1966 | Ott | 411/57 |
| 3,522,756 | 8/1970 | Wolf von Wolff | 411/57 |
| 4,142,440 | 3/1979 | Schefer | 411/57 X |
| 4,596,503 | 6/1986 | Mirsberger et al. | 411/57 X |
| 4,789,285 | 12/1988 | Fischer | 411/57 |

FOREIGN PATENT DOCUMENTS

| | | | |
|---|---|---|---|
| 1813812 | 7/1969 | Fed. Rep. of Germany | 411/72 |
| 2840087 | 1/1980 | Fed. Rep. of Germany | 411/57 |
| 2947752 | 7/1981 | Fed. Rep. of Germany | 411/57 |
| 3109686 | 9/1982 | Fed. Rep. of Germany | 411/57 |

Primary Examiner—Rodney M. Lindsey
Assistant Examiner—Jerry Redman
Attorney, Agent, or Firm—Elliot M. Olstein; Raymond J. Lillie

[57] ABSTRACT

An anchor assembly capable of being inserted in a hole in a substrate. The assembly includes a sleeve and a screw. The sleeve includes a top end, a body portion, and a bottom end. The sleeve includes at least one feeler prong adjacent the top end, and preferably a tip portion adjacent the bottom end. The anchor assembly may be inserted into a hole in the substrate. The feeler prong(s) enable the installer to known whether the sleeve has been inserted properly into the hole, and the tip serves to push dust away from the bottom of a hole to insure optimum penetration of the sleeve into the hole, as well as insuring full penetration of the screw into the sleeve.

10 Claims, 4 Drawing Sheets

FIG. 2  FIG. 1  FIG. 3
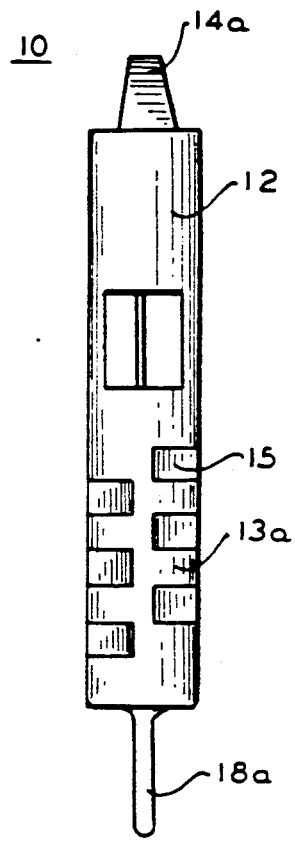
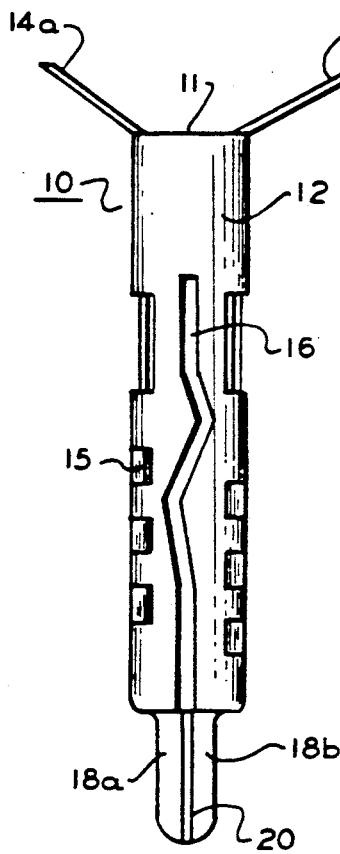
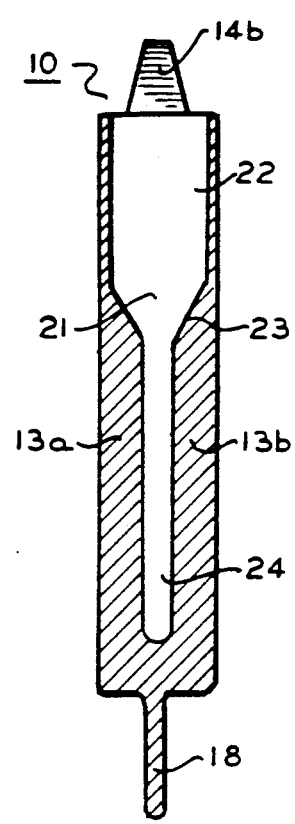
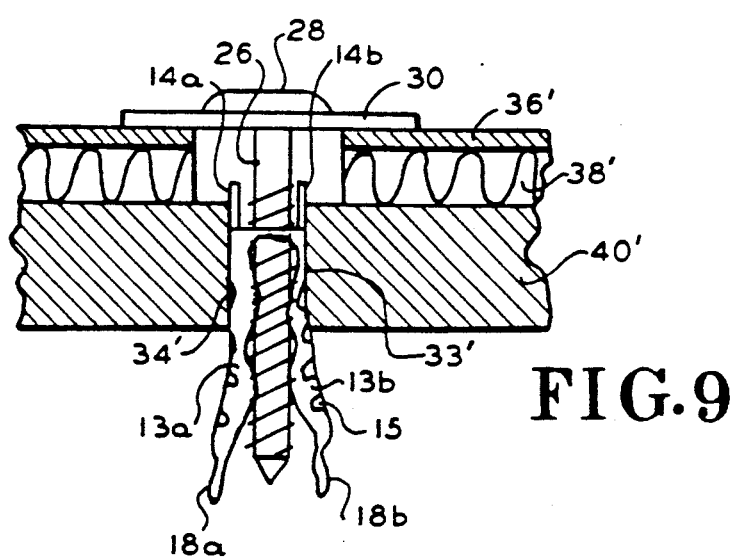
FIG. 9

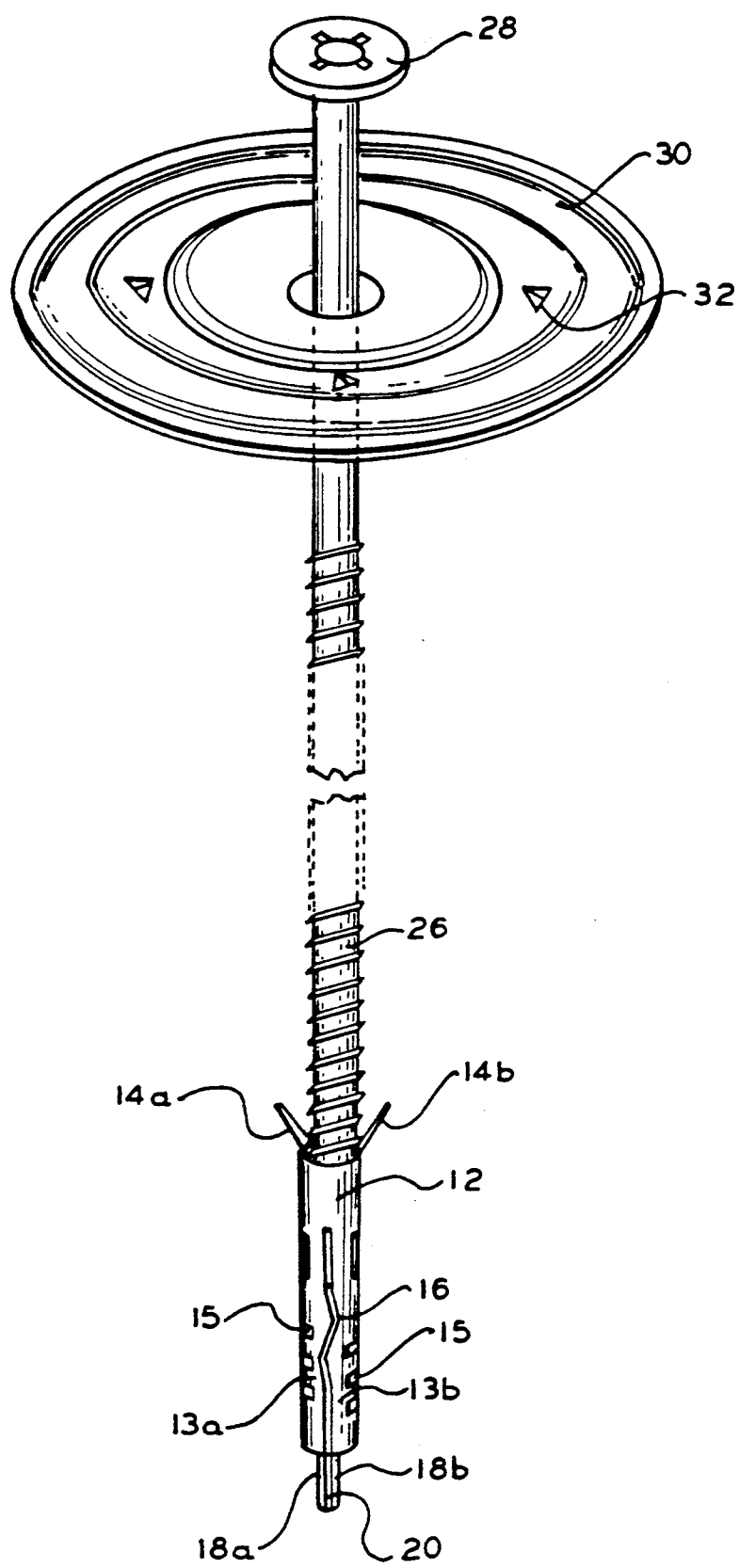

FIG. 7
FIG. 8
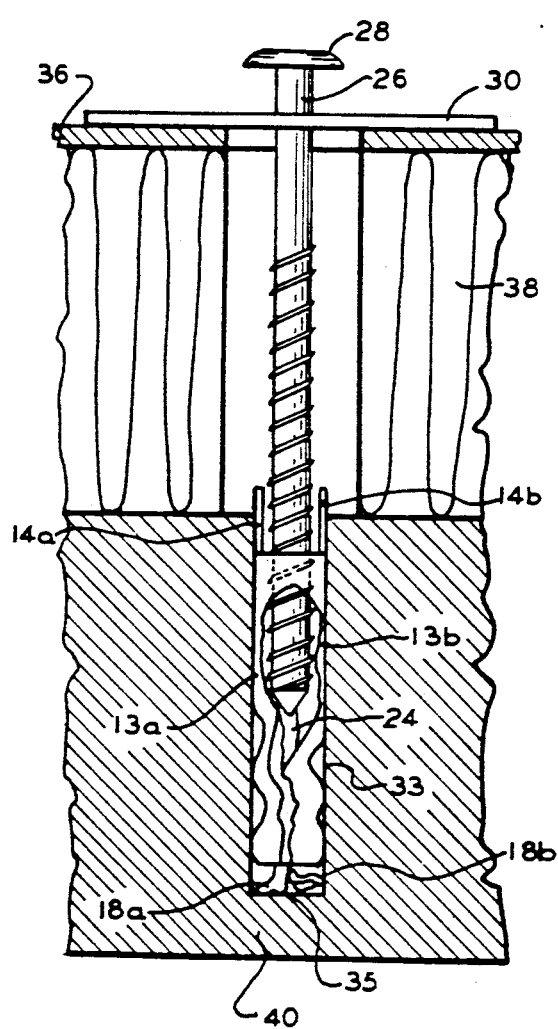
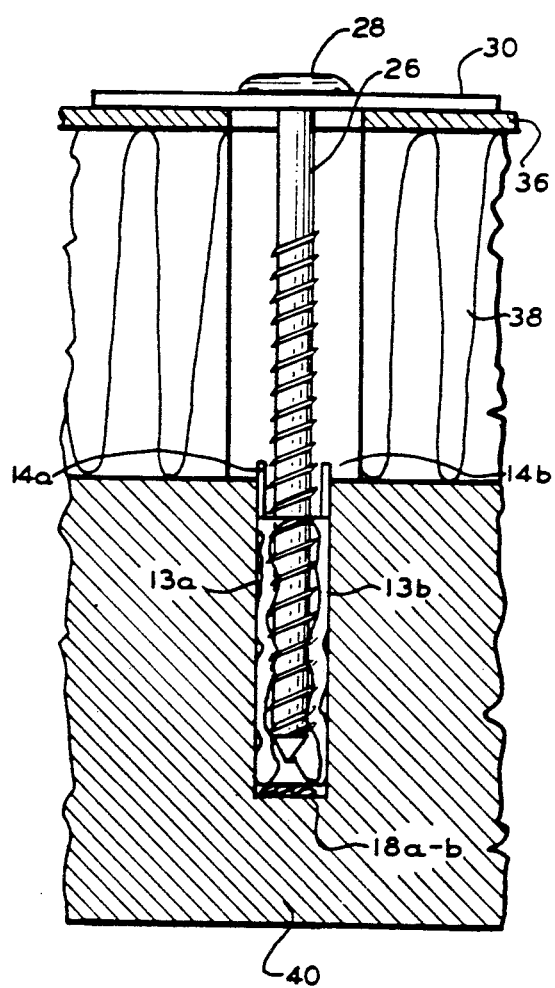

FASTENING SLEEVES AND FASTENING SYSTEMS EMPLOYING SAME

This application is a continuation-in-part of application Ser. No. 462,020, filed Jan. 8, 1990.

This invention relates to sleeves which are used in connection with fastening means to fasten materials to substrates. More particularly, this invention relates to sleeves which are inserted into pre-formed or pre-drilled holes in a substrate, such as a concrete roof deck.

In typical fastening systems which employ a sleeve, also known as a sleeve anchor, a screw or other type of fastening means is inserted partially into the sleeve. The sleeve and fastening means are then inserted into a hole pre-drilled through materials overlying a substrate, and into the substrate. A typical substrate may be a concrete roof deck, and the material(s) overlying the roof deck may be insulation and/or roof membranes. The sleeve may include a top flange which prevents the sleeve from entering a hole any further than the top flange. The body of the flange may include wings or feelers which extend outwardly from the body portion of the sleeve. The wings or feelers serve to hold the sleeve and the fastening means within a hole and also act as anti-rotational components.

Once the sleeve is inserted into the pre-drilled hole, the fastening means may be inserted further into the sleeve until insertion of the fastening means into the sleeve is completed. The sleeve may include cut portion(s) which provide for expansion of the sleeve as the fastening means is being inserted. Such expansion of the sleeve provides for better fastening of the materials to the substrate and aids in preventing the sleeve and the fastening means from being dislodged from the hole.

Such sleeve or sleeve anchors, however, do not tell the installer if the sleeve has been inserted properly in the hole; i.e., such sleeves are incapable of giving an indication whether the sleeve has been inserted into the hole to a sufficient depth. Such sleeves also do not indicate to the installer whether the sleeve has been inserted too far into the pre-drilled hole.

An alternative to a sleeve anchor which may be used to fasten at least one material to a substrate, such as a roof deck, is a one-piece anchor.

One example of such an anchor is a single piece anchor having a shank and an intermediate section split into two half-sections having a semi-circular cross-section. The two half-sections are expanded in opposite directions in the plane of the split. The unsplit diameter of the shank is smaller than the hole into which the anchor is inserted, and the maximum diameter of the split section is somewhat greater than that of the hole. When such an anchor is driven into a drilled hole, the expanded half sections are compressed inwardly and straightened out. The expanded half sections thus exert an anchoring force on the wall of the hole on opposite sides of the wall. An example of such an anchor is the Rawl Drive, sold by the Rawlplug Company, Inc., of New Rochelle, N.Y.

U.S. Pat. No. 4,828,445, issued to Giannuzzi, discloses a one-piece anchor having a deformed shank. When the shank is driven into a hole, the shank's original deformity or deformities become forcibly deformed. The memory of the shank is such, however, that when the shank is forcibly deformed, the shank seeks to maintain its original shape. By seeking to maintain its original shape, the shank exerts pressure on the wall of the hole and is able to keep a fixture or other object anchored to the substrate.

Anchors such as those hereinabove described, however, require considerable force in order to enable such anchors to be driven satisfactorily into a hole. If one wishes to fasten a soft substance to a hard substance, the force employed in driving the anchor may be such that unacceptable damage is caused to the soft material. For example, when one attempts to fasten a roof membrane and/or insulation to a concrete roof deck, the membrane and/or the insulation may become unacceptably torn as a result of the force applied in order to drive the anchor into the concrete, thus requiring that the membrane and/or insulation be replaced.

The hereinabove described anchors while being driven into a substrate may also chip the wall of the hole in the substrate, or put grooves in the hole. Such grooves and/or chipping may widen the hole or lessen the depth in the substrate and loosen the anchor within the hole such that the anchor no longer is effective in fastening or anchoring a material to a substrate, or may even fall out of the hole, if the anchor has been placed in a wall or ceiling. In the case where an anchor is used to fasten a roof membrane and/or insulation to a concrete roof deck, chipping of the concrete surrounding the hole may decrease the depth and reduce the tensile pull-out value of the anchor within the hole. The anchor then may not be effective in holding the membrane and/or insulation against the roof deck, thus making the membrane susceptible to wind uplift. Such wind uplift pulls the membrane from the roof deck, and if sufficiently severe, may remove the anchor from the hole. This wind uplift can also cause the anchor to lift slightly and reduced the compression on the membrane and/or insulation.

In addition, such one-piece anchors, like the conventional sleeve anchors hereinabove described, give no indication to the installer as to whether the anchor has been inserted into the hole to a sufficient depth. If the hole has been drilled properly and has not chipped excessively during the driving of the anchor into the hole, one could encounter difficulties in removing the anchor from the hole if one needed to remove the anchor.

It is therefore an object of the present invention to provide a fastening, or anchoring, system which includes an anchoring sleeve, whereby such a system will indicate to the installer whether the sleeve or sleeve anchor has been inserted into a hole at the correct depth, thus insuring proper setting of the fastening system.

Among the advantages of an anchoring sleeve and fastening system of the present invention are: (a) an indication to the installer that the sleeve has been inserted into a pre-drilled hole to the proper depth; (b) prevention of undue rotation of the sleeve; (c) the assurance that the anchoring sleeve has been inserted to the proper depth; (d) the prevention of premature expansion of the anchoring sleeve; (e) the ability to permit full penetration of a fastener through the anchoring sleeve; (f) the ability to be used in connection with various densities and thicknesses of substrate; (g) assurance of full expansion of the sleeve upon full penetration of the fastener through the sleeve; and (h) the ability to determine the proper depth of the hole before the sleeve is expanded.

In accordance with an aspect of the present invention, there is provided an anchor assembly for fastening at least one material to a substrate. The assembly comprises an anchoring sleeve and a screw. The anchoring sleeve is capable of being inserted into a hole in a substrate, and is adapted for receiving a fastening means. The sleeve includes a top end, a body portion, and a bottom end, and at least one feeler prong adjacent the top end. The at least one feeler prong is movable from an angular position in relation to the body portion of the sleeve to an upwardly and outwardly vertical position with respect to the body portion when the sleeve is inserted correctly in a hole in the substrate (i.e., when the sleeve is inserted to the proper depth). The screw is capable of being inserted into the sleeve, whereby the at least one material is fastened to the substrate upon completion of insertion of said screw into the sleeve. In a preferred embodiment, the sleeve includes at least two feeler prongs adjacent the top end.

In accordance with a most preferred embodiment, the sleeve further includes a tip portion adjacent the bottom end of the sleeve.

The tip portion, when employed, touches the bottom of the pre-drilled hole and acts as a standoff and insures that the sleeve is not pushed too far into the pre-drilled hole. The tip also serves to push away any dust that may be located at the bottom of the hole which aids in the penetration of the sleeve into the hole to the proper depth, and also ensures that the screw fully penetrates the anchoring sleeve. The tip also enables the sleeve to open fully upon full penetration of the screw through the sleeve. As the screw penetrates through the sleeve, the structural integrity of the tip is reduced, and then bends or crumples. Upon bending or crumpling of the tip, the sleeve attains its full expansion which insures that the sleeve is held in place.

The tip may further include a cut portion, or score line, which provides for breaking of the tip into at least two portions upon sufficient insertion of the screw into the anchoring sleeve.

In accordance with another embodiment, the sleeve may further include at least one guiding prong which extends outwardly from the body portion of the sleeve. The at least one guiding prong is located between the top end and the bottom end.

In accordance with yet another embodiment, the sleeve may further include a cut portion or score line, which extends from the body portion to the bottom end, and which provides for the opening and expansion of the sleeve upon insertion of a screw into the sleeve. In a preferred embodiment, the score line divides the sleeve into two wall portions. As the screw penetrates the sleeve, the two wall portions expand outwardly from the screw and from each other.

In another embodiment, the sleeve may further include at least one, and preferably a plurality of, recesses cut into the exterior of said body portion.

Such an anchor assembly in accordance with the present invention enables an installer to determine correctly whether an anchor assembly has been inserted into a hole to the proper depth. For example, the sleeve is attached to bottom of a screw by turning the bottom of the screw into the sleeve. The sleeve may be made of a material such as zinc such that threads are easily formed inside the sleeve upon turning of the screw inside the sleeve. The screw and sleeve are then inserted into a pre-drilled hole until the feeler prongs, which are at an acute angle to the top end of the sleeve before insertion, point vertically upward. The forcing of the feeler prong(s) to a vertically upward position may be felt by the installer in that, until the feeler prong(s) are moved to the vertical upward position, there is very little resistance to the insertion of the fastener and the screw. If the hole is not deep enough, the screw and the sleeve will simply turn within the hole if one attempts to penetrate the screw further into the sleeve. When the feeler prong(s) assume the vertical upward position, increased resistance to insertion is encountered by the installer. Thus, the installer can tell that the sleeve has reached the proper depth. The feeler prongs, when vertical, grip the threaded portion of the screw and provide for a greater surface area of the sleeve in contact with the threaded portion of the screw. If the feeler prong(s) remain at an acute angle to the top end upon complete insertion of the sleeve into the hole, then the installer can remove the sleeve and screw from the hole and re-drill the hole to a greater depth.

Once the sleeve and screw have been inserted to the proper depth, the screw may be turned further such that it achieves full penetration of the sleeve. The feeler prongs will stop the sleeve and screw from penetrating the hole for a distance more than the anchor length, regardless of whether the hole has been drilled to the proper depth or whether the hole has been drilled too deep. When the feeler prongs assume the upward and outwardly vertical position upon correct insertion of the sleeve into the hole, the feeler prongs wedge the sleeve within the hole so that the sleeve will not turn, even when the sleeve and screw are installed with percussion instruments. The feeler prongs also press tightly upon the threaded shaft of the screw and create a larger surface area of the sleeve which may be engaged by the threads of the screw, as the screw is subsequently turned within the sleeve in order to expand the sleeve. In a preferred embodiment, the sleeve includes a tip as hereinabove described, which aids in enabling full penetration of the screw into the sleeve. The tip, like the feeler prongs, may serve as a depth indicator by keeping the sleeve off the bottom of the hole to ensure that the screw travels the full distance through the sleeve. As the screw penetrates the sleeve, the tip bends or crumples, and the sleeve expands. Thus, the tip and the feeler prongs work together to insure that the sleeve has been inserted into a hole to the proper depth, and that the screw fully penetrates the sleeve subsequent to the correct insertion of the sleeve into the hole. In a preferred embodiment, the sleeve has a cut portion along which the sleeve expands as the screw is inserted into the sleeve. Upon completion of the insertion of the screw into the sleeve, the material is fastened to the substrate.

Examples of substrates into which the sleeve or sleeve anchor may be inserted include, but are not limited to roof decks. Materials which overlies the roof deck include, but are not limited to insulation and roof membranes.

In one embodiment, the anchor assembly may further include a means for pressing at least one material against a substrate. The sleeve and screw inserted through an opening in the pressing means. In a preferred embodiment, the pressing means is a stress plate. It is to be understood that other pressing means (e.g., a batten bar), may also be employed.

In accordance with yet another aspect of the present invention, there is provided an improvement in a roof which includes a roof substrate including a hole therein, and at least one material overlying the roof substrate. The improvement comprises the anchor assembly hereinabove described, which is inserted in the hole in the substrate, whereby the at least one material is fastened to the substrate upon completion insertion of the screw in the sleeve.

The invention will now be described with respect to the drawings, wherein:

FIG. 1 is a front isometric view of an embodiment of an anchoring sleeve in accordance with the present invention;

FIG. 2 is a side view of an embodiment of an anchoring sleeve in accordance with the present invention;

FIG. 3 is a cross-sectional view of an embodiment of an anchoring sleeve in accordance with the present invention;

FIG. 4 is a front isometric view of an embodiment of a fastening system in accordance with the present invention which comprises an anchoring sleeve, a screw, and a stress plate;

FIG. 7 is a cross-sectional view of the fastening system of FIG. 4 depicting partial penetration of the screw through the anchoring sleeve;

FIG. 8 is a cross-sectional view of the fastening system of FIG. 4 depicting complete penetration of the screw through the anchoring sleeve; and FIG. 9 is a cross-sectional view of the fastening system of FIG. 4 depicting complete penetration of the sleeve anchor and the screw through a hole drilled completely through a roofing substrate.

Figure 5:
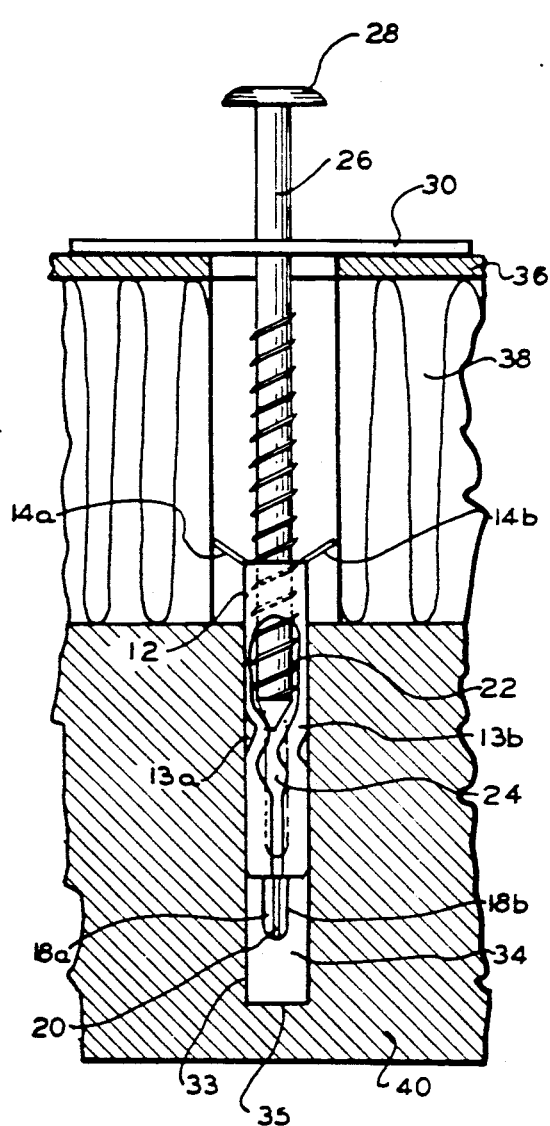
FIG. 5 is a cross-sectional view of the fastening system of FIG. 4 upon initial insertion of the anchoring sleeve and screw into a hole drilled partially through a roofing substrate.

Referring now to the drawings, an anchoring sleeve 10 in accordance with the present invention includes a top portion 11, a body portion 2 which includes side wall portions 13a and 13b along a jagged cut or score line 16.

Located adjacent the top portion 11 are feeler prongs 14a and 14b, which are initially at an acute angular position with respect to said body portion 12. As shown in the drawings, feeler prongs 14 and 14b extend upwardly and angularly from top portion 11. When the sleeve 10 is inserted correctly in a hole in a substrate, feeler prongs 14a and 14b will make initial contact with the top of roof deck 40 and then will move from the acute angular position to an upwardly vertical position as sleeve 10 penetrates hole 34, and press against the threaded portion 27 of screw 26 to provide an increased area of the sleeve 10 in contact with the threaded portion 27 of screw 26.

At the bottom of the body portion 12 is a tip 18, which is divided into tip portions 18a and 18b along cut or score line 20. Tip 18 serves as a standoff as the sleeve is inserted into a hole in a substrate. Tip 18 serves to push away any dust which may be at the bottom of a hole in a substrate, which enables full penetration of the sleeve 10 into the hole. In addition, the tip 18 enables full penetration of a screw through the sleeve. The tip 18 prevents the side wall portions 13a and 13b of sleeve 10 from splitting along score line 16 prematurely as a fastening means penetrates the sleeve 10. As the fastening means penetrates the sleeve 10, the structural integrity of tip 18 is reduced until it bends, splits, and/or crumples; however, by the time the structural integrity of tip 18 is damaged, the expansion aspect of the anchoring sleeve will hold the sleeve in place.

Along side walls 13a and 13b of anchoring sleeve 10 are disposed a plurality of recesses 15. Recesses 15 serve as receptacles for dust which may be scraped from the wall of a hole in a substrate as the sleeve 10 is inserted into the hole. Thus, recesses 15 serve to keep dust out of the way of sleeve 10 as the sleeve 10 is inserted into a hole. Recesses 15 also may grip into the wall of the hole and prevent the sleeve 10 from easily being pulled out from a hole after insertion.

In addition, the sleeve may include guide prongs (not shown) extending angularly and outwardly from the wall portions 13a and 13b, said guide prongs aiding the insertion of the sleeve 10 into a hole in a substrate.

Disposed within body 12 of sleeve 10 is a hole 21 having upper portion 22, a tapered portion 23, and a lower, narrow portion 24. Upper portion 22 is of a diameter approximate to that of a screw, which enables initial insertion of a screw into sleeve 10 without difficulty. As the fastening means is inserted through taper 23 and narrow portion 24, it will meet resistance from walls 13a and 13b as walls 13a and 13b are spread apart along score line 16, and tip portions 18a and 18b are spread apart along score line 20.

The anchoring sleeve 10 may be made of a malleable material which enables the feeler prongs 14a and 14b to be movable from an acute angular position to an upwardly vertical position upon correct insertion of the anchoring sleeve 10 into a hole in a substrate. The material is also one which is capable of being threaded; e.g., as one inserts a screw through upper portion 22, tapered portion 23, and narrow portion 24 of hole 21, walls 13a and 13b become threaded as the screw penetrates. The threads which are formed in walls 13a and 13b also enable to screw 26 to be removed easily from sleeve 10 if the screw 26 needs to be removed. A preferred malleable material is zinc.

Referring now to FIG. 4, the anchoring sleeve 10 is part of an anchor assembly which includes the anchoring sleeve 10, a screw 26 having a threaded portion 27 and a head portion 28, and a stress plate 30 having a central hole 31 and gripping prongs 32. Screw 26 is inserted through hole 31 of stress plate 30, and the bottom portion of screw 26 is inserted into the upper portion 22 of hole 21 inside sleeve 10. Prongs 32 of stress plate 30 are adopted for gripping the top surface of a material which overlies a substrate, such as the surface of a roof membrane. An example of a stress plate which may be employed as part of a fastening system in accordance with the present invention is described in U.S. Pat. Nos. 4,787,188 and 4,945,699.

Figure 6:
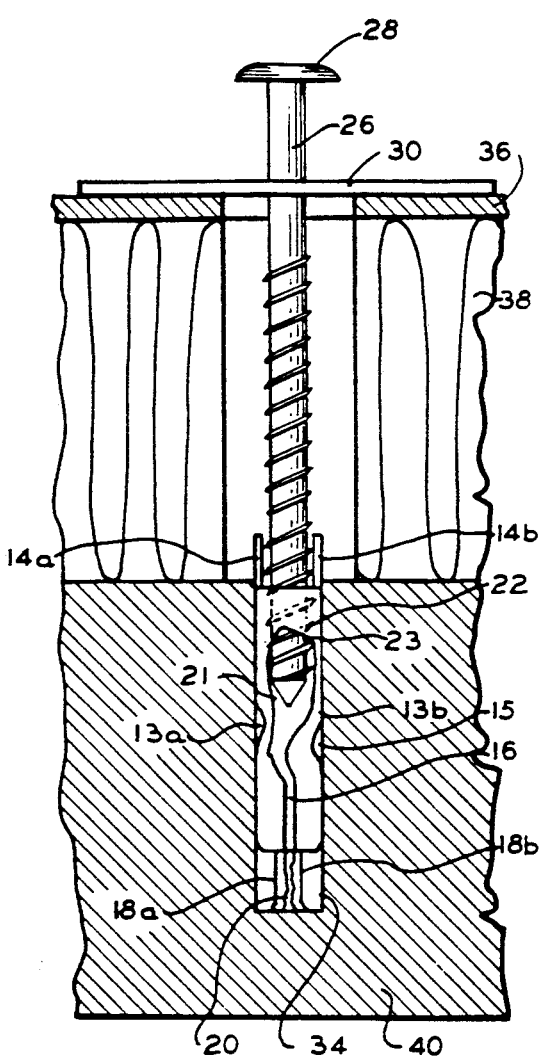
FIG. 6 is a cross-sectional view of the fastening system of FIG. 4 upon initial contact of the anchoring sleeve with the bottom of the hole in the roofing substrate.

Such as fastening system is especially adapted for fastening roof insulation and/or a roof membrane to a roof deck, as shown in FIGS. 5 to 9.

A hole 34 having a wall 33 and a bottom 35 is drilled through a roof membrane 36, a layer of insulation 38, and into a roof deck 40, which may be made of a high density material such as concrete. The anchoring sleeve 10, into the upper portion 22 of hole 21 of which screw 26 has been inserted, is inserted into hole 34 such that sleeve 10 has partially penetrated the portion of the hole 34 that is within roof deck 40. The sleeve may be inserted into hole 34 either manually or by means of an installation tool, such as a percussion hammer drill (not shown), that inserts the sleeve 10 and screw 26 into hole 34 such that head portion 20 of screw 26 is at a predetermined distance above membrane 36. Stress plate 30 rests upon roof membrane 36. Upon initial insertion of sleeve 10 into hole 34, feeler prongs 14a and 14b are in an acute angular position with respect to body portion 12. One inserts sleeve 10 completely into hole 34 by applying downward pressure (e.g., by pushing or hammering to the head portion 28 of screw 26). As the sleeve 10 penetrates hole 34, sleeve 10 scrapes against wall 33, and dust may be rubbed off from wall 33 and collected in recesses 15 of sleeve 10, thus preventing the dust from impeding the holding power of sleeve 10 against wall 33 of hole 34.

Because sleeve 10 is made of a malleable material, the walls 13a and 13b and recesses 15 of sleeve 10 will be formed against wall 33 of hole 34, and will conform to any uneven formations on wall 33.

The sleeve 10 and screw 26 are pushed into hole 34 until tip 18 contacts the bottom 35 of hole 34. Tip 18 serves to push away any dust which may have settled upon the bottom 35 of hole 34, as opposed to compacting dust against bottom 35 of hole 34, thus insuring that the sleeve 10 has penetrated the hole 34 fully. At this point, if hole 34 has been drilled to the proper depth, feeler prongs 14a and 14b will have moved to a vertically upward position with respect to the body portion 12 of sleeve 10, and press against the threaded portion 27 of screw 26. The installer can tell that the feeler prongs 14a and 14b have moved to a vertically upward position because the installer will meet increased resistance to the insertion of the sleeve 10 into hole 34 of roof deck 40. Once this increased resistance is met, the installer will know that the sleeve 10 has been properly inserted into hole 34. The feeler prongs 14a and 14b also assist in preventing rotation of sleeve 10 within hole 34 before the sleeve 10 is expanded as described hereinbelow.

If the installer inserts sleeve 10 into hole 34 without meeting any increased resistance, then the installer knows that the feeler prongs 14a and 14b remain in an acute angular position with respect to the body portion 12, and that the hole 36 has not bee drilled to a proper depth. The installer can then remove sleeve 10 and screw 26 from hole 34 and re-drill hole 34 to an acceptable depth.

After the sleeve 10 has been properly inserted into hole 34, one turns screw 26 so that head 28 will abut against stress plate 30, thus enabling screw 26 and stress plate 30 to fasten membrane 36 and insulation 38 to roof deck 40. Initially, the bottom of screw 26 is in the upper portion 22 of hole 21 of sleeve 10. As the installer turns screw 26, the screw 26 penetrates taper 23 and then narrow portion 24 of hole 21. As the screw penetrated downwardly through hole 21, threads 27 of screw 26 form threads in feeler prongs 14a and 14b and in walls 13a and 13b of sleeve 10. Also, walls 13a and 13b begin to expand outwardly from score line 16, against wall 33 of hole 34. Recesses 15 also may abut against wall 33 and collect any dust scraped from wall 33 as well, thus aiding in preventing the accumulation of dust at the bottom 35 of hole 34.

Although walls 13a and 13b of sleeve 10 begin to expand outwardly from score line 16 and push against wall 33 of hole 34, tip 18 prevents a premature full expansion of walls 13a and 13b of sleeve 10 from score line 16 and against wall 33 of hole 34. Such premature expansion of walls 13a and 13b could prevent full penetration of screw 26 through sleeve 10, thus resulting in an inadequate fastening of membrane 36 and insulation 38 to roof deck 40. Tip 18 serves as a standoff which serves to insure that sleeve 10 is opened properly as screw 26 penetrates sleeve 10. Tip 18 holds body portion 12 of sleeve 10 off the bottom 35 of hole 34 for a distance of at least the height of tip 18. This standoff effect enables screw 26 to penetrate sleeve 10 fully, which insures proper holding of sleeve 10 within hole 34. As screw 26 continues to penetrate taper 23 and then narrow portion 24 of hole 21, the tip 18 begins to lose its structural integrity. When screw 26 has penetrated approximately ⅔ of the length of hole 21, tip 18 breaks along score line 20 into tip portions 18a and 18b. At this stage of the fastening operation, screw 26 is able to continue to penetrate sleeve 10, and wall 13a and tip portion 18a, and wall 13b and tip portion 18b become flared outwardly away from screw 26 and from each other. Walls 13a and 13b continue to expand against and press against wall 33 of hole 34. Wall 33 is also contacted by recesses 15 of walls 13a and 13b, such recesses 15 enabling walls 13a and 13b of sleeve 10 to grip wall 33 of hole 34 more firmly, thus making dislodgement of the sleeve 10 from hole 34 more difficult. Also, as screw 26 penetrates sleeve 10 further, tip portions 18a and 18b may become bent or crumpled. Once tip 18 has broken after allowing for sufficient penetration of screw 26 through sleeve 10, tip portions 18a and 18b are no longer needed to insure proper expansion and placement of sleeve 10 within hole 34.

Once screw 26 has penetrated approximately the full length of sleeve 10, head 28 of screw 27 presses against stress plate 30, the prongs 32 of which grip membrane 36. In this way, screw 26 and stress plate 30 fasten membrane 36 and insulation 38 to roof deck 40. Sleeve 10, which has now been expanded within hole 34, prevents screw 26 from being pulled out of hole 34.

It is also contemplated that sleeve 10 and screw 26 may be inserted into a hole 34' which is drilled completely through a roof membrane 36', insulation 38', and a thin roof deck 40', which may be made of a lower-density material (e.g., gypsum). The sleeve 10 and screw 26 are inserted into hole 34' until feeler prongs 14a and 14b are in a vertically upward position, as hereinabove described. Once sleeve 10 has been inserted into hole 34' properly, a portion of sleeve 10 may project below hole 34' and roof deck 40' as shown in FIG. 9. Screw 26 is then turned such that it penetrates taper 23 and lower narrow portion 24 of hole 21 of sleeve 10 as hereinabove described, and walls 13a and 13b expand outwardly from score line 16 and against wall 33' of hole 34'. Tip 18 eventually breaks along score line 20. The portion of wall 13a and tip portion 18a, and the portion of wall 13b and tip portion 18b, which project below hole 34' and roof deck 40', become flared outwardly from screw 26 and from each other to a greater degree than the portions of walls 13a and 13b that are within hole 34', as the screw 26 penetrates approximately the full length of sleeve 10 in order to press stress plate 30 against membrane 36', thereby fastening membrane 36' and insulation 38' to roof deck 40' as hereinabove described.

Advantages of the present invention include the ability to provide a sleeve which, through the use of movable feeler prongs, can indicate to the installer that the sleeve has been inserted into a pre-drilled hole to the proper depth, as well as preventing undue rotation of the sleeve. The feeler prongs also engage the threads of the screw upon correct insertion of the sleeve in the hole, to provide a greater area of contact between the sleeve and the threads of the screw. In addition, the tip located at the bottom of the anchor enables one to insert the sleeve into the hole to the maximum depth, wherein the hole has a bottom, by pushing aside any dust lying at the bottom of the hole. In holes that have a bottom or are drilled entirely through a substrate, the tip also prevents premature expansion of the walls of the sleeve until a screw penetrates the sleeve for a sufficient length such that full penetration of the fastening mans is assured. In holes which have a bottom, the tip also insures full penetration of the screw by acting as a standoff, by keeping the body of the sleeve off the bottom of the hole for at least the distance of the height of the tip.

It is to be understood, however, that the scope of the present invention is not to be limited to the specific embodiments described above. The invention may be practiced other than as particularly described and still be within the scope of the accompanying claims.

What is claimed is:

1. An anchor assembly for fastening at least one material to a substrate, comprising:

an anchoring sleeve capable of being inserted into a hole in a substrate and adapted for receiving a fastening means, said sleeve including a top end, a body portion, and a bottom end, and at least one feeler prong extending axially from and beyond the top end and in a direction away from said bottom end, said at least one feeler prong being movable from an angular position in relation to said body portion of said sleeve to an upwardly and outwardly vertical position with respect to said body portion when said sleeve is inserted correctly in a hole in said substrate; and a screw capable of being inserted into said sleeve, whereby said at least one material is fastened to said substrate upon completion of insertion of said screw into said sleeve.

2. The assembly of claim 1 wherein said sleeve includes at least two feeler prongs adjacent said top end.

3. The assembly of claim 1 wherein said sleeve further includes a tip portion adjacent said bottom end of said sleeve.

4. The assembly of claim 1 wherein said sleeve further includes a cut portion, said cut portion extending from said body portion to said bottom end, said cut portion providing for the opening and expansion of said sleeve upon insertion of said screw into said sleeve.

5. The assembly of claim 1 wherein said sleeve further comprises at least one recess cut into the exterior of said body portion.

6. In a roof including a roof substrate including a hole therein, and at least one material overlying said roof substrate, the improvement comprising:

an anchor assembly comprising an anchoring sleeve inserted in said hole in said substrate, said sleeve including a top end, a body portion, and a bottom end, and at least one feeler prong extending axially from and beyond the top end and in a direction away from said bottom end, said at least one feeler prong being movable from an angular position in relation to said body portion of said sleeve to an upwardly and outwardly vertical position in relation to said body portion of said sleeve upon correct insertion of said sleeve in a hole in said substrate; and a screw inserted into said sleeve, whereby said at least one material is fastened to said substrate upon complete insertion of said screw in said sleeve.

7. The improvement of claim 6 wherein said sleeve includes at least two feeler prongs adjacent said top end.

8. The improvement of claim 6 wherein said sleeve includes a tip portion adjacent said bottom end of said sleeve.

9. The improvement of claim 6 wherein said sleeve further includes a cut portion, said cut portion extending from said body portion to said bottom end, said cut portion providing for the opening and expansion of said sleeve upon insertion of said screw into said sleeve.

10. The improvement of claim 6 wherein said sleeve further comprises at least one recess cut into the exterior of said body portion.

* * * * *